United States Patent

[11] 3,627,889

[72] Inventors: Robert Armistead Lucas Mendham; Herbert Morton Blatter, Summit, both of N.J.
[21] Appl. No.: 884,322
[22] Filed: Dec. 11, 1969
[45] Patented: Dec. 14, 1971
[73] Assignee: Ciba Corporation Summit, N.J.
Continuation-in-part of application Ser. No. 839,704, July 7, 1969. This application Dec. 11, 1969, Ser. No. 884,322

[54] 2-ACYLIMINO-1,3-DIAZACYCLOALKANES
3 Claims, No Drawings
[52] U.S. Cl. .................................. 424/200, 260/256.4 H, 260/256.5 R, 424/232, 424/251
[51] Int. Cl. ........................................... C07d 51/18
[50] Field of Search .............................. 260/256.4 H

[56] References Cited
UNITED STATES PATENTS
3,027,370  3/1962  Bindler .......................... 260/256.4
3,168,520  2/1965  Kleemann et al. ............... 260/256.4
3,483,203  12/1969 Werner ......................... 260/251

Primary Examiner—Alex Mazel
Assistant Examiner—R. J. Gallagher
Attorneys—Harry Goldsmith, Joseph G. Kolodny and Mario A. Monaco ABSTRACT:
1-$R_1$-2-trimethoxybenzoylimino;1,3-diazacycloalkanes, e.g. those of the formula

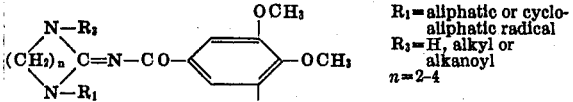

$R_1$ = aliphatic or cycloaliphatic radical
$R_2$ = H, alkyl or alkanoyl
$n = 2-4$ or salts thereof exhibit hypnotic effects.

2-ACYLIMINO-1,3-DIAZACYCLOALKANES

CROSS-REFERENCES TO RELATED APPLICATIONS

This is a continuation-in-part of application Ser. No. 839,704, filed July 7, 1969.

BACKGROUND OF THE INVENTION

According to Burkhardt et al., Chem. Ber. 100, 2569 (1967), 2-(acetyl or benzoyl)-imino-1,3-diazacycloalkanes are obtained from N-dichloromethylene-acetamide or -benzamide and diaminoalkanes. This method obviously cannot be used in the preparation of corresponding trimethoxybenzoylimino derivatives, since the necessary N-dichloromethylene-trimethoxybenzamide cannot be prepared without chlorinating the benzene nucleus in one or both of the unsubstituted positions.

According to another method, various "2-imino-1,3-di-substituted hexahydropyrimidines and imidazolidines" are obtained according to U.S. Pat. No. 3,168,520, which compounds are useful in "the making of dyeings and of synthetic substances fast to gas-fading".

SUMMARY OF THE INVENTION

The present invention concerns and has for its object the provision of new 5 to 7 ring-membered 1-$R_1$-2-trimethoxybenzoylimino- 1,3-diazacycloalkanes (or of the tautomeric 1-$R_1$-2-trimethoxybenzoylamino- 1,3-diazacycloalkanes or of the isomeric 1-$R_1$-2-imino-3-trimethoxybenzoyl-1,3-diazacycloalkanes) or of N-alkyl or acyl derivatives or salts thereof, wherein $R_1$ is an aliphatic or cycloaliphatic radical, preferably of those having formula I

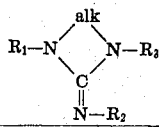
(I)

in which $R_1$ is lower alkyl, alkenyl, alkynyl, 3 to 7 ring-membered cycloalkyl, cycloalkenyl, cycloalkyl-lower alkyl or cycloalkenyl- lower alkyl, $R_2$ is trimethoxybenzoyl, $R_3$ is hydrogen, lower alkyl or alkanoyl and alk is lower alkylene separating the adjacent nitrogen atoms by two to four carbon atoms, or of therapeutically acceptable salts thereof, as well as of corresponding pharmaceutical compositions and of methods for the preparation and application of these products. Said compositions are useful hypnotic agents.

DESCRIPTION OF THE PREFERRED EMBODIMENT

The substituent $R_1$ represents preferably lower alkyl, e.g., methyl, ethyl, n- or i-propyl or -butyl, 3-methylbutyl, 1- or 2-pentyl, -hexyl or -heptyl, but also lower alkenyl, e.g., allyl, methallyl, 2-butenyl, 2-but-2-enyl, 2- or 3-pentenyl, 2-pent-2-enyl or 2-hexenyl, lower alkynyl, e.g., propargyl, 2-butynyl or 2-hex-3-ynyl, or 3 to 7 ring-membered cycloalkyl, e.g., cyclopropyl, cyclopentyl or cyclohexyl, cycloalkenyl, e.g., 1- or 2-cyclopentenyl, -cyclohexenyl or -cycloheptenyl, cycloalkyl-lower alkyl, e.g., cyclopropylmethyl, cyclopentylmethyl, 2-cyclopentylethyl or cyclohexylmethyl, or cycloalkenyl-lower alkyl, e.g., 1-cyclopentenylmethyl, 2-cyclopent-1-enylethyl or 1-cyclohexenylmethyl. The term "lower" referred to above and hereinafter in connection with organic radicals or compounds respectively, defines such with up to 7, preferably up to four carbon atoms.

The trimethoxybenzoyl radical $R_2$ contains the methoxy groups in any of the five positions of the phenyl nucleus thereof, but preferably represents 3,4,5-trimethoxybenzoyl.

Acyl derivatives of the invention are derived from aliphatic or aromatic carboxylic acids, preferably of lower alkanoic acids; thus the radical $R_3$ represents, for example, acetyl, propionyl or pivalyl.

The alkylene moiety alk separating the nitrogen atoms of the 1,3-diazacycloalkane moiety by two to four carbon atoms preferably represents 1,3-propylene but also, for example, 1,2-ethylene or -propylene, 1,2-, 1,3-, 1,4- or 2,3-butylene, 1,2-, 1,3-, 1,4-, 2,3- or 2,4-pentylene, -hexylene or -heptylene.

The compounds of the invention exhibit valuable pharmacological properties. Besides some central nervous system depressing effects, such as sedative and skeletal muscle relaxing effects, they predominantly exhibit hypnotic effects. This can be demonstrated in animal tests, using advantageously mammals, such as mice, rats, rabbits, cats, dogs or monkeys as test objects. The compounds of the invention can be applied to the animals enterally or parenterally, e.g., orally, intraperitoneally or intravenously, for example, in gelatin capsules or in the form of aqueous solutions or suspensions. The dosage may range between about 1 and about 500 mg./kg./day, preferably between about 5 and about 200 mg./kg./day, advantageously between about 10 and about 100 mg./kg./day, whereby the enterally applied dose usually is higher than the parenterally applied dose. The effect on the spontaneous and induced motor activity can be tested in the mice jiggle cage, light box or rotorod test system, wherein a depression is recorded after oral medication. Oral doses in the cat induce a sleeplike state (constricted pupils and relaxed nictitating membranes) from which the animal can be aroused without showing motor incoordination. Oral doses produce also sleep in dogs and monkeys wherein the animals assume a normal position. Low intravenous doses produce in the cat depression of several reflexes, e.g., the flexor and patellar reflex, and in the rabbit a lesser reduction of the respiratory rate as with conventional hypnotics at equihypnotic doses. Accordingly, the compounds of the invention are useful sedative-hypnotic agents, for example, in the treatment or management of restlessness and emotional tension, for suppression of anxiety and neurotic manifestations, and preferably for the induction of sleep. They are also useful intermediates in the preparation of other valuable products, especially of pharmacologically active compounds.

Particularly useful are the compounds of formula I, in which $R_1$ is alkyl with up to four carbon atoms, $R_2$ is 3,4,5-trimethoxybenzoyl, $R_3$ is hydrogen or alkyl with up to four carbon atoms and alk is 1,2-ethylene, 1,2- or 1,3-propylene or therapeutically acceptable acid addition salts thereof, as well as those compounds of formula I, in which $R_1$ is also alkenyl or alkynyl with up to four carbon atoms, $R_3$ is also alkanoyl with up to four carbon atoms and alk is also 1,2-, 1,3-, 1,4- or 2,3-butylene, or therapeutically acceptable acid addition salts thereof.

Especially valuable are compounds of Formula II

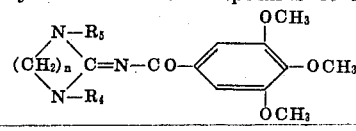
(II)

in which $R_4$ is methyl, ethyl, n-propyl or allyl, $R_5$ is hydrogen or acetyl and $n$ is an integer from 2 to 4, preferably 3, or therapeutically acceptable acid addition salts thereof, which exhibit a high order of hypnotic activity and low toxicity, preferably after oral application.

The compounds of this invention are prepared according to methods known per se. For example, the process for their preparation consists in:

a. acylating a 1-$R_1$-2-imino-3-$R_3$-1,3-diazacycloalkane with a trimethoxybenzoic acid or a reactive functional derivative thereof or b. converting in an N-Y-trimethoxybenzamide or -imide, in which Y is a substituent convertible into a 1-$R_1$-3-$R_3$-1,3-diazacyclo-2-(alkenyl or alkylidene) radical respectively, Y into said radical or c. methylating a 1-$R_1$-3-$R_3$-2-trihydroxybenzoylimino-1,3-diazacycloalkane and, if desired, converting any resulting 5 to 7 ring-membered compound into another compound of the invention.

The acylation according to item (a) is advantageously performed with a reactive functional derivative of the trimethoxybenzoic acid, such as a lower alkyl ester, halide, e.g., chloride or bromide, or anhydride thereof, e.g., the simple or a mixed anhydride with any other suitable acid, such as a lower alkyl carbonic acid.

In the starting material mentioned under item (b), the substituent Y is, for example, a 1-unsubstituted 3-$R_3$-1,3-diazacyclo-2-(alkylidene or alkenyl) radical, which can be substituted in the 1-position, for example, with a reactive ester of the alcohol $R_1$-OH, for example, that of a strong mineral or sulfonic acid, such as a hydrohalic acid, e.g., hydrobromic or hydriodic acid, sulfuric acid or a lower alkane or benzene sulfonic acid, e.g., methane-, ethane- or p-toluenesulfonic acid. Another substituent Y is, for example, a dialkylmercaptomethylene group, e.g., dimethyl-mercaptomethylene. The corresponding starting material can be reacted with the diamine $R_1$-NH-alk-NH-$R_6$, wherein $R_6$ is hydrogen or lower alkyl, in order to obtain the compounds of the invention.

The methylation according to item (c) is advantageously performed with diazomethane, but also with a reactive ester of methanol, e.g., such mentioned above.

The compounds so obtained can be converted into each other according to methods known per se. For example, resulting compounds of formula I in which $R_3$ is hydrogen, can be acylated or alkylated in 3-position as shown under items (a) and (b). Resulting compounds in which $R_3$ is an acyl group, e.g., trimethoxybenzoyl or lower alkanoyl, can be hydrolyzed, e.g., by the careful application of acidic or alkaline hydrolyzing agents, such as aqueous mineral acids or alkalis, e.g., a hydrohalic or sulfuric acid, or an alkali metal, e.g., sodium or potassium, hydroxide, carbonate or bicarbonate.

The compounds of the invention are obtained in the free form or in the form of their salts, depending on the conditions under which the above process is carried out. A resulting free base can be converted into a corresponding acid addition salt, for example by reacting it with an inorganic or organic acid, preferably a therapeutically useful acid, or with a corresponding anion exchange preparation, and isolating the desired salt. An acid addition salt may be converted into the free compound by treatment with a base, e.g., a metal hydroxide, ammonia or a hydroxyl ion exchange preparation. Therapeutically useful acids are, for example, inorganic acids, such as strong metalloidic acids, for example, hydrohalic, e.g., hydrochloric, hydrobromic, sulfuric, phosphoric, nitric or perchloric acid, or organic acids, such as carboxylic or sulfonic acids, e.g., formic, acetic, propionic, succinic, glycollic, lactic, malic, tartaric, citric, ascorbic, maleic, hydroxymaleic, pyroracemic, phenylacetic, benzoic, 4-aminobenzoic, anthranilic, 4-hydroxybenzoic, salicylic, aminosalicylic, embonic, nicotinic, methanesulfonic, ethanesulfonic, hydroxyethanesulfonic, ethylenesulfonic, halogenbenzenesulfonic, toluenesulfonic, naphthalenesulfonic, sulfanilic and cyclohexylsulfamic acid; methionine, tryptophan, lysine and arginine.

These or other salts, for example, the picrates, can also be used for purification of the resulting free compounds, which are converted into salts, the salts separated and the free compounds liberated from the salts. In view of the close relationship between the free compounds and the compounds in the form of their salts, whenever a compound is referred to in this context, a corresponding salt is also intended, provided such is possible or appropriate under the circumstances.

Resulting mixtures of isomers can be separated into the single isomers by methods in themselves known, e.g., by fractional distillation, crystallization and/or chromatography. Racemic products can likewise be resolved into the optical antipodes, for example, by separation of diastereomeric salts thereof, e.g., by the fractional crystallization of $d$- or $l$-tartrates.

The above reactions are carried out according to standard methods, in the presence or absence of diluents, preferably such as are inert to the reagents and are solvents thereof, of catalysts, condensing, neutralizing agents and/or inert atmospheres, at low temperatures, room temperature or elevated temperatures, at atmospheric or superatmospheric pressure. For example, in the above acylation or alkylation reactions, the generated mineral or sulfonic acid may be neutralized with inorganic or organic bases, such as alkali or alkaline earth metal carbonates or bicarbonates, tri-lower alkylamines or pyridine.

The invention also comprises any modification of the above process, wherein a compound resulting as an intermediate at any stage thereof, is used as starting material and the remaining steps are carried out or the process is discontinued at any stage thereof, or in which the starting material is formed under the reaction conditions or is used in the form of its salts or reactive derivatives. For example, in the reaction according to item (b) with compounds in which Y is di-lower alkylmercaptomethylene, the intermediate formed first is an isothiourea derivative, which ring-closes in a second step under the influence of heat and/or acidic catalysts. Also in the reaction according to item (c), mono and dimethoxybenzoylimino intermediates are formed during the etherification procedure. Preferred are starting materials which lead to those compounds of the invention, which are indicated above as the preferred embodiments of the invention.

The starting material used is known or, if new, may be prepared according to methods known per se. For example, the starting material mentioned under item (a) is prepared in accordance with the methods described in U.S. Pat. No. 3,027,370 or British Pat. No. 765,547. The starting material mentioned under item (b) in which Y is a 1-unsubstituted 3-$R_3$-1,3-diazacycloalkyl or -alkenyl radical can be obtained either by the acylation according to item (a) or from corresponding 1-benzyl-3-$R_3$-2-trimethoxybenzoylimino-1,3-diazacycloalkanes, which are subjected to reductive cleavage, e.g., with the use of catalytically activated hydrogen. The starting material in which Y is di-lower alkylmercaptomethylene can be obtained by addition of lower alkylmercaptanes to trimethoxybenzoyl-isothiocyanates and reacting the resulting dithiourethanes with a lower alkyl halide or sulfonate. The starting material mentioned under item (c) can be prepared analogous to the process described under item (a) advantageously with the use of trihydroxybenzoic acid lower alkyl esters.

The pharmacologically active compounds of the invention are useful in the manufacture of pharmaceutical compositions containing an effective amount thereof in conjunction or admixture with excipients suitable for either enteral or parenteral application. Preferred are tablets and gelatin capsules comprising the active ingredient together with (a) diluents, e.g., lactose, dextrose, sucrose, mannitol, sorbitol, cellulose and/or glycine, (b) lubricants, e.g., silica, talcum, stearic acid, its magnesium or calcium salt and/or polyethyleneglycol, for tablets also (c) binders, e.g., magnesium aluminum silicate, starch paste, gelatin, tragacanth, methylcellulose, sodium carboxymethylcellulose and/or polyvinylpyrrolidone, if desired, (d) disintegrants, e.g., starches, agar, alginic acid or its sodium salt, enzymes of the binders or effervescent mixtures and/or (e) adsorbents, colorants, flavors and sweeteners. Injectable compositions are preferably aqueous isotonic solutions or suspensions, and suppositories are advantageously fatty emulsions or suspensions. They may be sterilized and/or contain adjuvants, such as preserving, stabilizing, wetting or emulsifying agents, solution promoters, salts for regulating the osmotic pressure and/or buffers. They may also contain other therapeutically valuable substances. Said pharmaceutical compositions are prepared according to conventional mixing, granulating or coating methods respectively and contain about 0.1 to 75 percent, preferably about 1 to 50 percent of the active ingredient.

The following examples are intended to illustrate the invention and are not to be construed as being limitations thereon. Temperatures are given in degrees Centigrade, and all parts wherever given are parts by weight.

EXAMPLE 1

To the solution obtained from 5.76 g. sodium and 100 ml. anhydrous methanol, 48.58 g. 1-methyl-2-imino-hexahydropyrimidine hydrobromide are added while stirring and cooling. After one-half hour, the mixture is evaporated in vacuo on the water bath for 4 hours. Hereupon 125 ml. tetrahydrofuran are added under nitrogen followed by the solution of 28.8 g. 3,4,5-trimethoxybenzoyl chloride in 185 ml. tetrahydrofuran during 35 minutes at 5°–10° while stirring. After stirring overnight at room temperature, the mixture is poured onto 770 ml. ice and water and 21.2 g. sodium bicarbonate are added while stirring. The mixture is extracted three times with 100 ml. methylene chloride, the extract dried, filtered and evaporated below 40°. The residue is triturated with 45 ml. diethyl ether for 1 hour at room temperature, the mixture filtered and the residue washed with cold diethyl ether, to yield the 1-methyl-2-(3,4,5-trimethoxybenzoylimino)-hexahydropyrimidine of the formula

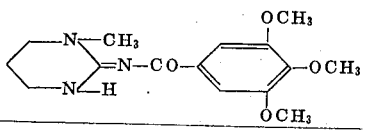

melting at 142°–145°.

The starting material is prepared as follows: To the mixture of 97.6 g. 3-methylamino-propylamine and 270 ml. methanol, the solution of 118 g. cyanogen bromide in 270 ml. methanol is added dropwise during 2 hours at 5°–15° while stirring. After stirring at room temperature overnight, the mixture is refluxed for 6 hours and evaporated in vacuo. The residue is recrystallized from 217 ml. hot isopropanol and dried for 5 hours in vacuo, to yield the 1-methyl-2-imino-hexahydropyrimidine hydrobromide melting at 142°–144°.

EXAMPLE 2

To the solution obtained from 2.3 g. sodium and 40 ml. methanol, 19.4 g. 1-methyl-2-imino-hexahydropyrimidine hydrobromide are added portionwise while stirring. After the initial lumps formed are dissolved, the mixture is evaporated in vacuo at room temperature for about 3 hours. The dry residue is slurried in 40 ml. tetrahydrofuran and 30 ml. triethylamine, whereupon the solution of 23 g. 3,4,5-trimethoxybenzoyl chloride in 50 ml. tetrahydrofuran is added during 15 minutes at 5°–15° while stirring. The mixture is stirred at room temperature overnight and evaporated in vacuo. The residue is shaken with 60 ml. methylene chloride and 60 ml. aqueous ammonia, and the aqueous phase washed with methylene chloride. The combined organic solution is washed with 30 ml. water, dried, filtered and evaporated in vacuo. The residue is taken up in 60 ml. benzene and the solution extracted with 30 ml. water and 30 ml. 10 percent hydrochloric acid. The combined aqueous layer is made basic with ammonia, the precipitate formed filtered off, washed with water, dried and recrystallized from tetrahydrofuran, to yield the 1-methyl-2-(3,4,5-trimethoxybenzoylimino)-3-(3,4,5-trimethoxybenzoyl)- hexahydropyrimidine of the formula

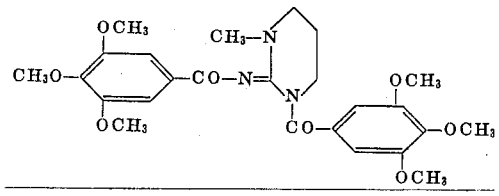

melting at 206°–208°.

EXAMPLE 3

Preparation of 1,000 tablets each containing 250 mg. of the active ingredient:

Formula:
| | |
|---|---|
| 1-methyl-2-(3,4,5-trimethoxybenzoylimino)-hexahydropyrimidine | 250.0 g. |
| Wheat starch | 346.8 g. |
| Magnesium aluminum silicate | 20.0 g. |
| Methylcellulose | 13.3 g. |
| Stearic acid | 13.3 g. |
| Colloidal silica | 6.6 g. |
| Anhydrous ethanol | q.s. |
| Purified water | q.s. |

Procedure:

All powders with the exception of the silica and 96.8 g. of the starch are passed through a screen having openings of 0.6 mm. and mixed well. From the remaining starch and 65 ml. water a paste is formed which is used to granulate the powders together with the ethanol. The wet granulate is passed through a screen with 2 mm. openings and dried overnight at 35°. The dry granulate is broken in a hammer mill, passed through a screen with 1.2 mm. openings and compressed into tablets each weighing 0.65 g. using concave punches with 12 mm. diameter, uppers quartered.

EXAMPLE 4

To the solution of 1 g. 1-methyl-2-(3,4,5-trimethoxybenzoylimino)-hexahydropyrimidine in 5 ml. pyridine, 1 ml. acetic anhydride is added and the mixture allowed to stand at room temperature for 2 days. It is evaporated in vacuo, the residue dissolved in 2 ml. hot tetrahydrofuran and the precipitate formed after cooling filtered off, to yield the 1-methyl-3-acetyl-2-(3,4,5-trimethoxybenzoylimino)-hexahydropyrimidine of the formula

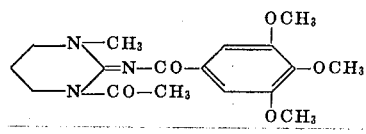

melting at 135°–137°.

EXAMPLE 5

To the solution of 5 g. 2-(3,4,5-trimethoxybenzoylimino-hexahydropyrimidine in 50 ml. dimethylformamide, 0.7 g. of 57 percent sodium hydride in mineral oil are added and the mixture stirred for 1 hour at room temperature. After cooling to 5°, the mixture of 1.5 ml. ethyl iodide and 12 ml. dimethylformamide is added dropwise during 7 minutes and the mixture stirred 3 hours at room temperature. It is diluted with 180 ml. ice water, extracted with methylene chloride, the extract dried, filtered and evaporated. The residue is triturated with 15 ml. cyclohexane, filtered off and washed with cyclohexane, to yield the 1-ethyl-2-(3,4,5-trimethoxy-benzoylimino-hexahydropyrimidine of the formula

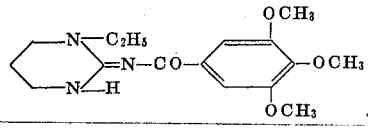

melting at 123°–125°.

In the analogous manner, the 1-n-propyl-2-(3,4,5-trimethoxybenzoylimino)-hexahydropyrimidine is prepared, melting at 106°–107°.

The starting material is prepared as follows: To the solution obtained from 2.3 g. sodium and 50 ml. methanol, 18 g. 2-imino-hexahydropyrimidine hydrobromide are added while stirring and cooling. After one-half hour, 22.6 g. methyl 3,4,5-trimethoxy-benzoate are added, the mixture stirred one-half hour at room temperature and gradually heated to the internal temperature of about 140°–150° while distilling off methanol.

Said temperature is maintained for one-half hour and the mixture further evaporated in the vacuum of a water-jet pump. The residue is taken up in 20 ml. water, the mixture extracted with 60 ml. methylene chloride, the extract dried, filtered and evaporated. The residue is taken up in 30 ml. hot benzene, the solution cooled, the crystals formed filtered off, dissolved in 80 ml. methanol, the solution concentrated to half the volume, the precipitate formed filtered off and washed with methanol, to yield the 2-(3,4,5-trimethoxybenzoylimino)-hexahydropyrimidine melting at 181°–183°. From the combined mother liquors another crop thereof can be obtained.

In the analogous manner, the compound of example 1 can be obtained from half the equivalent amount of methyl 3,4,5-trimethoxybenzoate instead of the 3,4,5-trimethoxybenzoyl chloride.

EXAMPLE 6

To the solution of 5 g. 2-(3,4,5-trimethoxybenzoylimino)-hexahydropyrimidine in 50 ml. dimethylformamide, 0.7 g. of 57 percent sodium hydride in mineral oil are added and the mixture stirred for 1 hour at room temperature. After cooling to 5°, the mixture of 1.5 ml. allyl chloride and 11.5 ml. dimethylformamide is added dropwise during 7 minutes and the mixture stirred 3 hours at room temperature. It is diluted with 180 ml. ice water, extracted with methylene chloride, the extract dried, filtered and evaporated. The residue is triturated with 15 ml. pentane, taken up in the minimum amount of benzene and the solution chromatographed on 75 g. aluminum oxide. 200 ml. of the first benzene eluate are collected, evaporated and the residue recrystallized from methanol, to yield the 1-allyl-2-(3,4,5-trimethoxybenzoylimino)-hexahydropyrimidine of the formula

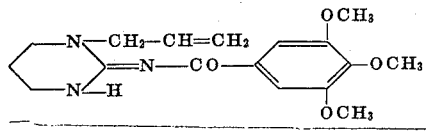

melting at 114°–146°.

We claim:

1. A pharmaceutical composition containing a hypnotically effective amount of a compound of the formula

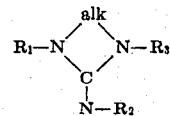

in which $R_1$ is lower alkyl, lower alkenyl, lower alkynyl or cycloalkyl, cycloalkenyl, cycloalkyl-lower alkyl or cycloalkenyl-lower alkyl, wherein the cycloalk(en)yl moiety is unsubstituted and the ring-size is 3- to 7-membered, $R_2$ is trimethoxybenzoyl, $R_3$ is hydrogen, lower alkyl or lower alkanoyl and alk is lower alkylene separating the adjacent nitrogen atoms by two to four carbon atoms, or a therapeutically acceptable salt thereof, and a pharmaceutical excipient.

2. A composition as claimed in claim 1, containing a hypnotically effective amount of a compound of the formula

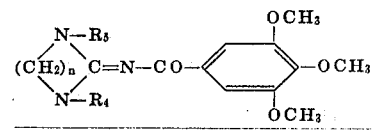

in which $R_4$ is methyl, ethyl, n-propyl or allyl, $R_5$ is hydrogen or acetyl and n is the integer 3, or a therapeutically acceptable salt thereof.

3. A composition as claimed in claim 6, containing a hypnotically effective amount of the 1-methyl-2-(3,4,5-trimethoxy-benzoylimino)-hexahydropyrimidine or a therapeutically acceptable salt thereof.

* * * * *

PO-1050
(5/69)

UNITED STATES PATENT OFFICE
CERTIFICATE OF CORRECTION

Patent No. 3,627,889            Dated December 14, 1971

Inventor(s) Robert Armistead Lucas et al

It is certified that error appears in the above-identified patent and that said Letters Patent are hereby corrected as shown below:

Column 8, in claim 1, the lower portion of the formula should read:

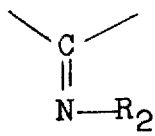

Column 8, line 35, change "6" to --- 1 ---.

Signed and sealed this 23rd day of January 1973.

(SEAL)
Attest:

EDWARD M. FLETCHER, JR.
Attesting Officer

ROBERT GOTTSCHALK
Commissioner of Patents aaa